(12) United States Patent
Prince et al.

(10) Patent No.: US 7,035,025 B2
(45) Date of Patent: Apr. 25, 2006

(54) COMPACT PRECISION BEAM MANIPULATORS

(75) Inventors: James B. Prince, Santa Clara, CA (US); Scott M. Detro, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 51 days.

(21) Appl. No.: 10/447,429

(22) Filed: May 28, 2003

(65) Prior Publication Data

US 2004/0240088 A1 Dec. 2, 2004

(51) Int. Cl.
*G02B 7/18* (2006.01)

(52) U.S. Cl. ...................... 359/831; 359/822
(58) Field of Classification Search ............... 359/831, 359/837, 811, 819, 822, 823, 871, 876; 248/476
See application file for complete search history.

(56) References Cited

U.S. PATENT DOCUMENTS 2,672,786 A * 3/1954 Capstaff .................. 356/399
4,586,787 A * 5/1986 Fiandra et al. ............. 359/830
4,822,974 A * 4/1989 Leighton ................ 219/121.67
5,237,457 A * 8/1993 Oono et al. ................ 359/837

* cited by examiner

Primary Examiner—Thong Nguyen
Assistant Examiner—Arnel C. Lavarias

(57) ABSTRACT

Compact beam manipulators employ one or more Risley prism sets with or without a parallel plate translator. One beam manipulator contains a plate mounted to permit pitch and yaw adjustments and a prism set mounted to permit rotations. The rotations of the prisms adjust a beam direction, and adjustment of the plate adjusts the beam position. Another beam manipulator contains a prism set mounted to permit rotations and pitch and yaw adjustments of the prisms. The rotations and pitch and yaw adjustments provide coupled changes in the position and direction of a beam, and iterative adjustments alternate between rotating prisms to change the beam direction and the adjusting pitch and yaw to change the beam position. The iterative adjustments are complete when the beam has a target position and a target direction to within required tolerances. Gluing elements to optic holders minimizes stress-induced birefringence and temperature and humidity effects.

13 Claims, 6 Drawing Sheets

COMPACT PRECISION BEAM MANIPULATORS

BACKGROUND

Precision optical systems such as interferometers often use beams having precisely controlled positions and directions. However, many types of beam sources deliver beams having positions and/or directions that vary from one beam source to the next. A beam delivered from a remote laser through an optical fiber, for example, has a position and a direction dependent on fiber orientation and collimating lens position. Accordingly, a simple mechanical alignment of the beam source (e.g., the optical fiber) may be unable to provide a beam having a position and a direction within the acceptable tolerances of a precision optical system. Beam manipulators are thus required to precisely shift or deflect the beam from the position and the direction that the source supplies to the position and the direction that the precision optics require.

Beam manipulators often employ reflective surfaces or mirrors that can be adjusted to deflect a beam to the appropriate angle or direction. As a reflective manipulator is adjusted to alter the direction of the beam, there is a factor of two magnification between the adjustment of the manipulator and the angle that the beam moves. This angular magnification and the stability of reflective manipulators is a concern in achieving highest stability in precision optical systems.

Beam manipulators can also use transmissive optics to steer a laser beam in position or direction. FIGS. 1A and 1B illustrate a deflector system 100 using matched wedges 110 and 120, which are sometimes referred to as a Risley prism set, to adjust the direction of a beam 130. Beam 130, which is incident on wedge 110, refracts in accordance with Snell's Law at each of the four air-glass interfaces 111, 112, 121, and 122 of the two wedges 110 and 120.

In the configuration of FIG. 1A, consecutive interfaces 112 and 121 are parallel to each other, and the angular deflection of beam 130 at interface 121 is equal and opposite to the angular deflection of beam 130 at interface 112. Similarly, interfaces 111 and 122 are parallel to each other, and since interfaces 112 and 121 cause no net angular deflection, the angular deflection of beam 130 at interface 122 is equal and opposite to the angular deflection at interface 111. Accordingly, in the configuration of FIG. 1A, system 100 causes no net angular deflection of beam 130.

Wedges 110 and 120 can be rotated with respect to each other to change the relative angle between interfaces 112 and 121. FIG. 1B illustrates a configuration of system 100 where wedge 120 has been rotated so that interfaces 112 and 121 make a maximum angle with each other. In the configuration of FIG. 1B, refractions at interfaces 112, 121, and 122 deflect beam 130 in the same direction, causing the largest angular deflection θmax that system 100 can achieve. Smaller rotations of wedge 120 relative to wedge 110 produce smaller angular deflections, so that system 100 can achieve any desired angular deflection of beam 130 between 0 and θmax. The relative orientations of wedges 110 and 120 can thus be set to provide the desired (polar) angular deflection. System 100 can be also rotated as a unit about its optical axis to adjust an azimuthal angle of the deflection.

Varying a wedge angle (i.e., the angle between surfaces 111 and 112 and between 121 and 122) or the index of refraction of wedges 110 and 120 changes the maximum angular deflection θmax of system 100. The angular range achieved by system 100 is thus a function of the wedge angle and the index of refraction of the glass. A larger wedge angle or refractive index provides system 100 with a greater range for the angular deflections of the beam but makes fine-tuning to the desired angle more difficult. In particular, the angular resolution of system 100 is a function of the wedge angle, the refractive index of the wedges 110 and 120, and the precision achieved for rotations of wedges 110 and 120.

Translators, which control the position of beams, can be similarly implemented using only transmissive optical elements. FIG. 2 illustrates a translator 200 including an optical plate 210 having two plane parallel surfaces 211 and 212. Surfaces 211 and 212 are parallel, so that refraction at surface 211 deflects a beam 230 by an angle that is equal but opposite to the deflection caused by refraction at surface 212. Accordingly, translator 200 preserves the direction of beam 230, but plate 210 translates beam 230 by a displacement D that depends on the thickness L of plate 210, its index of refraction, and the angle that plate 210 makes with incident beam 230. Adjusting the pitch and yaw of plate 210 effectively adjusts the magnitude and direction of displacement D.

A precision optical system using a deflector system 100 as illustrated in FIGS. 1A and 1B or a translator 200, as illustrated in FIG. 2, requires an optical mount that permits precise control of the orientation of the optical elements. Additionally, a change in the temperature of the optical mount should not change the orientations of the optical elements. Preferably, the optical mount would have a low part count to reduce expense and also be compact to permit use in applications having limited space.

SUMMARY

In accordance with an aspect of the invention, a compact, modular beam manipulator combines a Risley prism set and a parallel plate translator to provide uncoupled adjustments of both the direction and the position of a beam. The optical elements can be fixed in optic holders that provide relative rotation. The mounts permit rotation of the optical elements about selected axes. The alignment or rotation of the optic holders can be performed by hand or with a tool (e.g., a tooling wand) that improves alignment precision. Once the position and the direction of a beam are adjusted as desired, the optical elements can be "locked" into place by mechanical means (e.g., press fitting or clamping) and/or by an adhesive. Adhesives are used to attach the optic elements to the optic holders. The adhesive can be applied in such a way as to minimize the effects of temperature, humidity, and motion of the optical elements, and to minimize stress-induced birefringence when the optic holders are clamped in place.

In accordance with another aspect of the invention, a Risley prism set is mounted to permit relative and unison rotation about a first axis having a direction near the direction of a beam being manipulated and about second and third axes that are substantially perpendicular to the first axis and to each other. Using thick wedges in the Risley prism set allows adjustment of both the beam direction and the beam position, and provides a very compact beam manipulator capable of use in an application having limited space. Rotations about each of the axes can affect both the direction and the position of the output beam, and an iterative adjustment process may be needed to achieve the desired position and direction of the beam.

One specific embodiment of the invention is a beam manipulator providing beam position adjustments that are independent of beam direction adjustments. The beam manipulator includes an optical plate having opposing parallel surfaces, first and second optical wedges along an optical path through the plate, and a mounting structure for the plate and the first and second wedges. The mounting structure generally provides adjustments including: rotation of the first wedge about the optical path; independent rotation of the second wedge about the optical path; and adjustment of pitch and yaw angles of the plate relative to the optical path.

An exemplary configuration of the mounting structure includes a base, a first optical mount for the plate, and a second optical mount for the wedges. The first and second optical mounts attach to the base to provide a modular beam manipulator that can be used in a variety of optical systems. The first optical mount can include an optic holder to which the plate is attached and a structure, which attaches to the base in a manner that permits rotation of the structure about a first axis. The optic holder is attached to the structure in a manner that permits rotation of the optic holder about a second axis, perpendicular to the first axis. The second optical mount can include a structure attached to the base, wherein the first wedge is mounted on a first side of an opening through the structure and the second wedge is mounted on a second side of the opening.

Another specific embodiment of the invention is a beam manipulator that includes first and second wedges and a mounting structure. The mounting structure provides adjustments including: rotation of the first wedge about an optical path of the beam; independent rotation of the second wedge about the optical path; and adjustment of a pitch angle and a yaw angle of the wedge set relative to the optical path.

One embodiment of the mounting structure for this "trans-wedge" beam manipulator includes first and second structures. The first wedge is mounted on a first side of an opening through the first structure, and the second wedge is mounted on a second side of the opening. A clamp for the first structure has an unclamped state that permits rotations of the first and second wedge and a clamped state that fixes the orientations of the first wedge and the second wedge relative to the first structure. The second structure attaches to the first structure in a manner that permits rotation of the first structure about a first axis, while the second structure can be rotated about a second axis.

Yet another embodiment of the invention is a method for controlling a path of a beam using a "trans-wedge" manipulator. The method includes: (a) placing a wedge set including a first wedge and a second wedge in a path of the beam; (b) rotating the first wedge and/or the second wedge about the path to deflect the beam toward a target direction; and (c) adjusting an angle between the path and an axis through the wedge set to translate the beam toward a target position. A determination of whether step (c) left the beam within a required angle of the target direction can be made, and after the determination, step (b) is repeated if the beam is outside the required angle. Similarly, a determination of whether step (b) left the beam within a required distance of the target position can be made, and after this determination, step (c) is repeated if the beam is outside the required distance. An iterative process is thus possible which alternates between steps (b) and (c) until the beam reaches the target direction and position.

The "trans-wedge" beam manipulator experiences coupled angle and translation adjustments, except in the case when the two wedges are oriented to cancel one another. Rotating the first wedge and/or the second wedge can intentionally leave an angular separation or overshoot between the beam and the target direction, so that adjusting the angle between the path and the axis deflects the beam closer to the target direction. Similarly, adjusting the angle between the path and the axis can leave the beam offset from the target position, so that rotating the first wedge and/or the second wedge shifts the beam closer to the target position. Rotations and adjustments that provide intentional overshoots are particularly useful when making relatively large adjustments to the direction and/or position of the beam.

BRIEF DESCRIPTION OF THE DRAWINGS

Use of the same reference symbols in different figures indicates similar or identical items.

DETAILED DESCRIPTION

In accordance with an aspect of the invention, compact beam manipulators adjust both the direction and the position of a beam such as a laser beam. In one embodiment of the invention, a beam manipulator provides an adjustment of the position of the beam that is uncoupled from the adjustment of the direction of the beam. Accordingly, a first adjustment of the beam manipulator can deflect the beam from an initial direction that a beam source provides to a final direction that an optical system requires. A second adjustment of the beam manipulator can then displace the beam to the required position without changing the previously set beam direction. In another embodiment of the invention, a compact beam manipulator adjusts both the direction and the position of the beam using a Risley prism set in a mount permitting rotations about three axes.

Figure 3A:
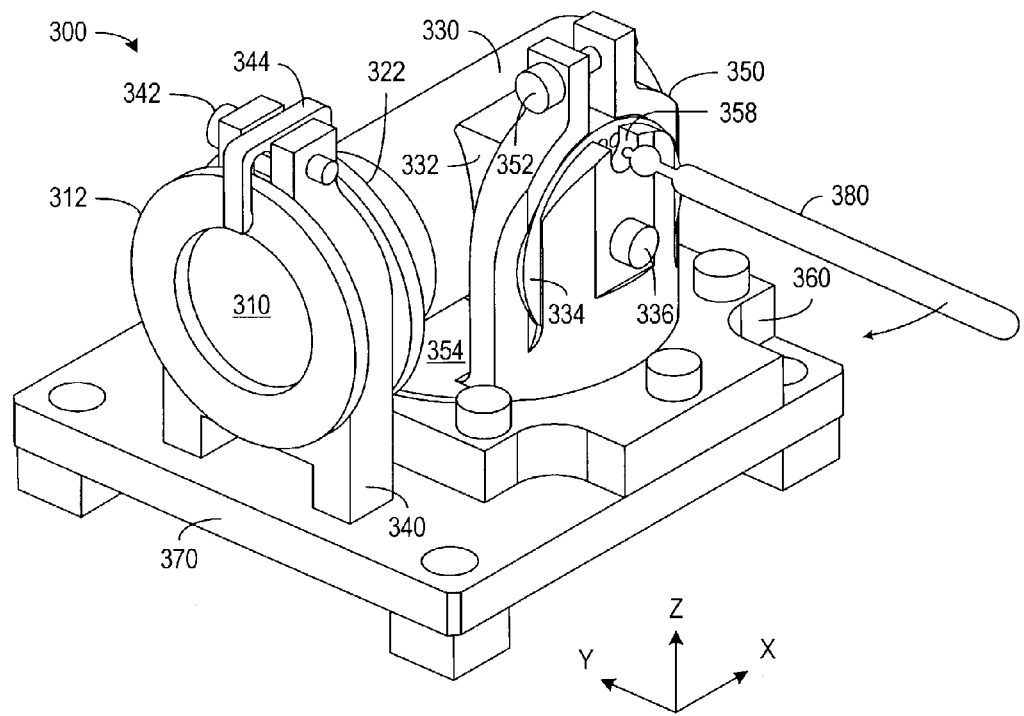
FIGS. 3A and 3B are perspective views of a beam manipulator in accordance with an embodiment of the invention permitting adjustment of the direction of a beam and decoupled adjustment of the position of the beam.
Figure 3B:
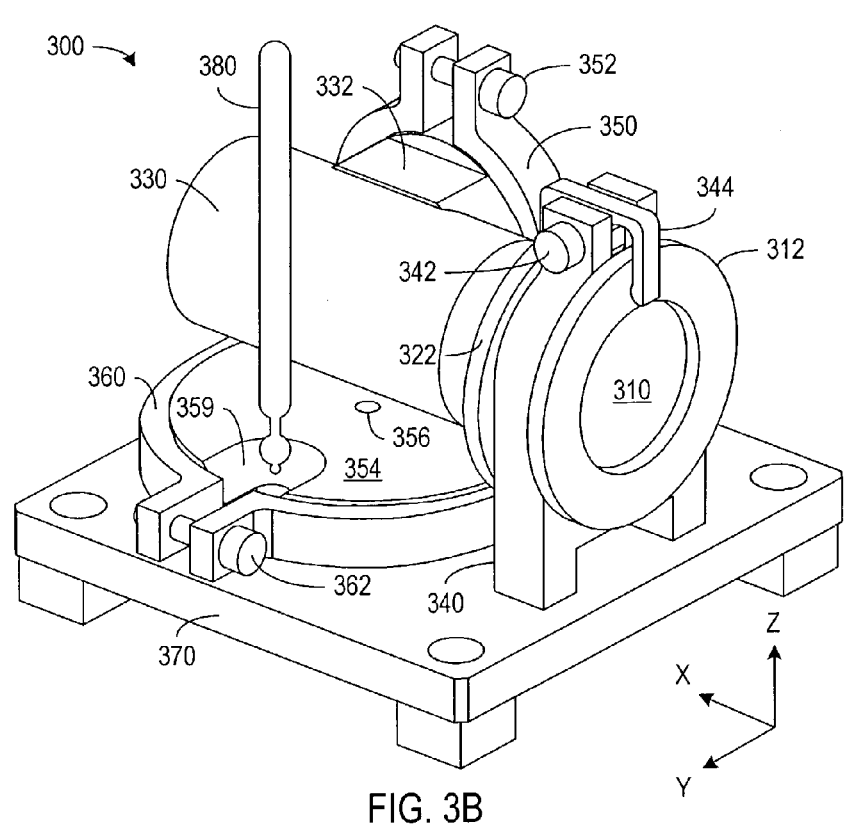
Figure 4:
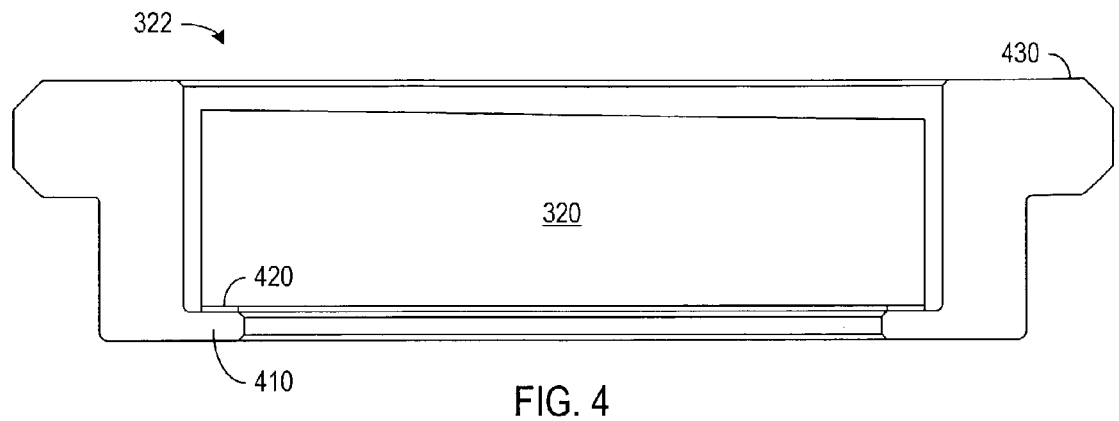
FIG. 4 shows a cross-sectional view of an optic holder holding a prism for use in the beam manipulator of FIGS. 3A and 3B.

FIGS. 3A and 3B show perspective views of a beam manipulator 300 capable of adjusting both the position and the direction of a beam, where the position adjustment is uncoupled from the direction adjustment. Beam manipulator 300 includes wedges 310 and 320 forming a Risley prism set for angular adjustment of a beam and a plane parallel plate 330 for position adjustment of the beam. Wedge 320 is not visible in the views of FIGS. 3A and 3B, but as shown in FIG. 4, wedge 320 is in an optic holder 322 that is visible in FIGS. 3A and 3B. A laser or other beam source (not shown) can direct an input beam at wedge 310 or in the opposite direction at plate 330. Regardless of the direction with which the beam traverses wedges 310 and 320 and plate 330, the Risley prism set (i.e., wedges 310 and 320) adjusts the direction of the beam, and the plane parallel optical plate 330 adjusts the position of the beam.

In an exemplary embodiment of the invention, each wedge 310 and 320 is a prism of an optical material such as BK7 glass having a circular cross-section and opposite sides that are at a physical wedge angle between 100 μrad and 20 mrad. Wedge 310 is preferably identical to wedge 320 and particularly should have the same wedge angle as wedge 320 to provide an orientation that provides zero angular deflection. As noted above, larger wedge angles generally provide a larger range of angular adjustment of the beam, and smaller wedge angles generally provide better resolution or precision in setting the direction of the beam. Each wedge 310 or 320 is preferably about 3 mm thick or less to minimize the beam displacement that wedges 310 and 320 cause when deflecting the beam.

Figure 1A:
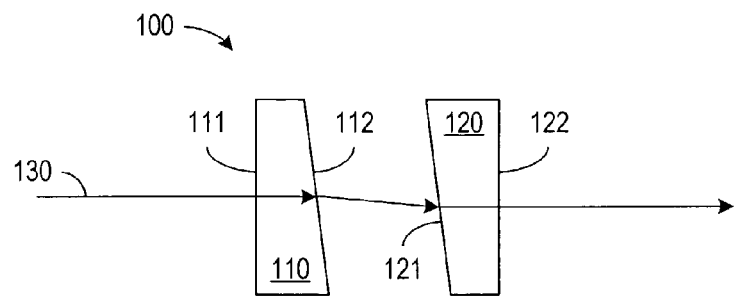
FIGS. 1A and 1B show a known beam deflector using a Risley prism set for adjustment of the direction of a beam.
Figure 1B:
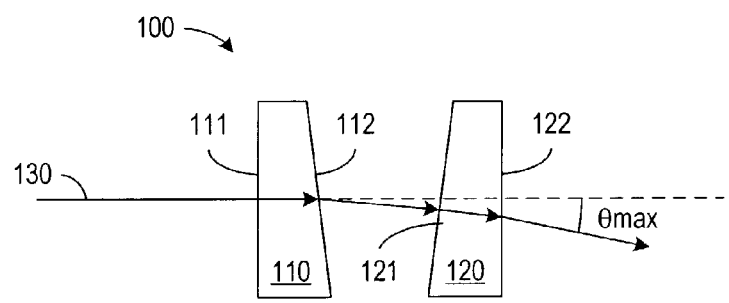
Figure 2:
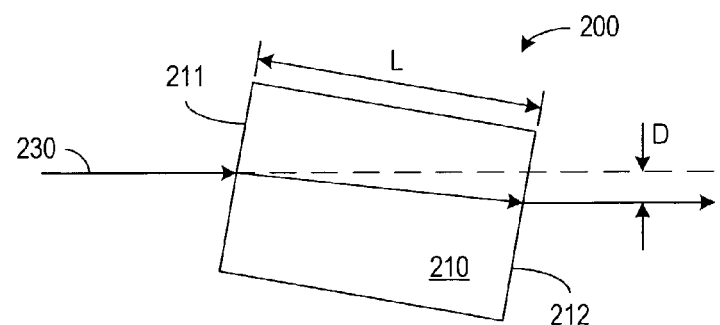
FIG. 2 shows a known beam translator using a plate having parallel sides to adjust the position of a beam.

Prisms 310 and 320 can be oriented as in FIG. 1 with parallel sides 111 and 122 furthest from each other and angled sides 112 and 121 adjacent to each other. Alternatively, the parallel sides of wedges 310 and 320 can be adjacent to each other, while the angled sides are furthest apart. Operation of wedges 310 and 320 to deflect a beam is similar in either case.

Wedges 310 and 320 are in respective optic holders 312 and 322. Optic holders 312 and 322, which are substantially identical to each other, fit into opposite sides of an opening in an optical mount 340. Holders 312 and 322 are circular to permit rotation of one or both of holders 312 and 322 in mount 340 when adjusting the beam direction.

FIG. 4 is a cross-sectional view of an embodiment of optic holder 322. As illustrated, optic holder 322 is generally ring-shaped and can be made of a metal or other resilient material preferably having a coefficient of thermal expansion matching that of optical mount 340. In an exemplary embodiment of the invention, holder 322 is made of 400 series stainless steel, which can be hardened to minimize galling between optic holder 322 and optical mount 340 during adjustment. Optic holder 322 has an inner ledge 410 to which wedge 320 can be attached using an adhesive 420 such as Dow Corning 6-1104. Other than inner ledge 410, the inner diameter of holder 322 is larger than the diameter of wedge 320, permitting differential thermal expansion of wedge 320 and optic holder 322 without contact at the sides of optic holder 322. Using a flexible adhesive 420 to attach wedge 320 to inner ledge 410 minimizes the effects of changes in optic holder 322 due to temperature or stress-induced deformation when optic holder 322 is clamped in place. Misalignment caused by temperature changes, humidity changes, and stress-induced birefringence in wedge 320 is thus minimized.

An outer ledge 430 of optic holder 322 extends beyond the sides of optical mount 340 and may include features such as ridges that facilitate rotation of optic holder 322 within optical mount 340.

Figure 5:
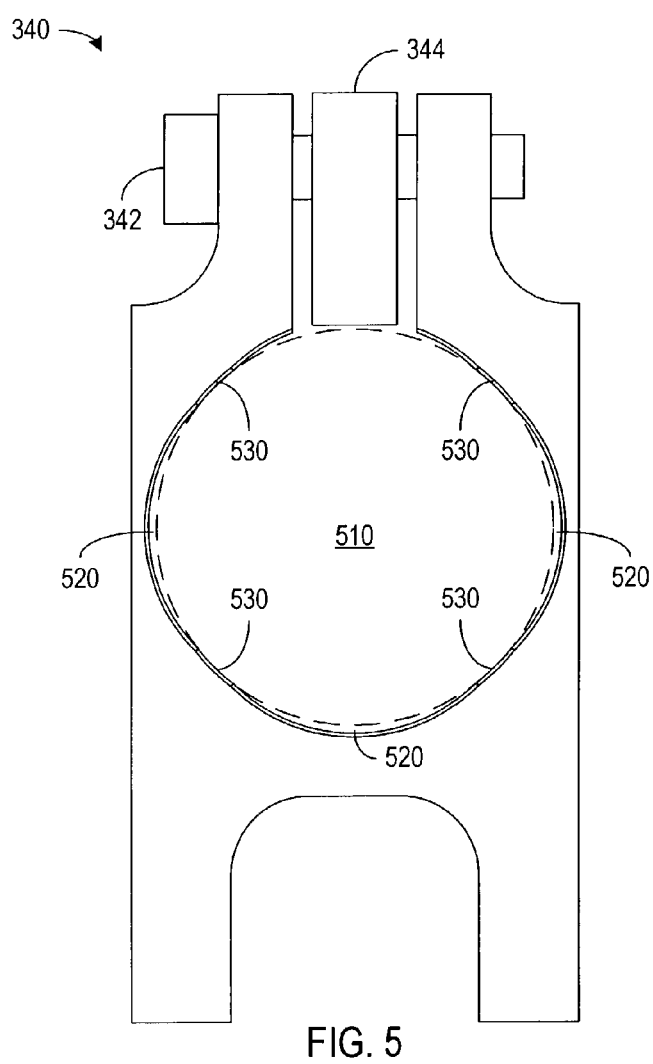
FIG. 5 shows a front view of a clamp/mounting structure of the optic holder of FIG. 4.

FIG. 5 shows an embodiment of optical mount 340. Optical mount 340 includes opening 510 into which optic holders 312 and 322 fit. Opening 510, instead of being purely circular, has scalloped or concave sections 520 so that only separated regions 530 around the perimeter of opening 510 contact optic holders 312 and 322. A clamping screw 342 in optical mount 340 is tightened to keep optic holders 312 and 322 at fixed positions when wedges 310 and 320 are properly aligned to provide the desired deflection of the beam. Loosening clamping screw 342 permits rotation of optic holders 312 and 322 for the alignment process, and a removable clip 344 prevents optic holders 312 and 322 from falling out of optical mount 340 when clamping screw 342 is loose.

Plate 330, as shown in FIGS. 3A and 3B, resides in an optic holder 332 having a concave surface to which plate 330 attaches, for example, using an adhesive. Plate 330 in the exemplary embodiment of the invention is a cylindrical block of an optical quality material such as BK7 having a height or thickness of about 36 mm and diameter of about 20 mm. The dimensions for plate 330 will vary depending on the application. Optic holder 332 can be made of a resilient material such as 416 stainless steel.

Optic holder 332 has a circular portion 334 that fits into an opening in an optical mount 350. A screw 336 captivates the optic holder 332 to optical mount 350, retaining optic holder 332 during pitch adjustment. When a clamping screw 352 in optical mount 350 is loose, optic holder 332 can be rotated for adjustment of the pitch of plate 330. The contact areas of the opening in the optical mount 350, which can be similar to contact areas 530 of mount 340, define the rotation axis for the pitch of plate 330. The pitch of plate 330 controls the magnitude of the displacement of the beam in a Z direction in FIGS. 3A and 3B. After the pitch of plate 330 has been adjusted to provide the desired displacement of the beam in the Z direction, clamping screw 352 is tightened to clamp optic holder 332 and therefore plate 330 in place.

Optical mount 350 also has a circular base portion 354 that fits into a clamp 360, forming an axis of rotation. A retention screw 356 captivates the optical mount 350 to the base plate 370. When a clamping screw 362 in clamp 360 is loose, optical mount 350 can be rotated about an axis parallel to the Z direction to control the yaw of plate 330. The yaw angle of plate 330 controls the component of the beam displacement in the Y direction, and clamping screw 362 is tightened to lock optical mount 350 in place after an adjustment achieves the desired beam displacement in the Y direction. Clamp 360 can be scalloped in the same manner as opening 510 in optical mount 340 for better clamping of optical mount 350, and optical mount 350 can be hardened to prevent galling with clamp 360 and base plate 370 during adjustment.

Optical mount 340 containing wedges 310 and 320 and optical mount 350 containing parallel plate 330 are mounted on a common base 370. Beam manipulator 300 thus provides an integrated module that can adjust both position and direction of a beam, and the module is easy to use in many types of laser beam delivery systems, including those used for silicon wafer lithography metrology applications.

Wedges 310 and 320 and plate 330 can be aligned by hand or with a tool such as tooling wand 380. For use of tooling wand 380 with beam manipulator 300, optical mount 350, as illustrated in FIG. 3A, has an opening 358 through which a tooling wand 380 can engage features such as notches or holes in optic holder 332. Tooling wand 380 acts as a lever with a fulcrum near optic holder 332 so that a relatively large movement of the end of tooling wand 380 causes a small rotation of optic holder 332 about an axis parallel to the Y direction. Greater precision in the adjustment of optic holder 332 can thus be achieved. A tooling wand 380 that is about 100 mm long, for example, with a tip that is about 2.5 mm from the fulcrum can improve the resolution of the pitch angle setting by up to 40 times.

FIG. 3B similarly shows a notch 359 in optical mount 350 through which tooling wand 380 can engage notches in base 370. A relatively large movement of the end of tooling wand 380 will then cause a relatively small rotation of mount 350 about the axis through screw 356 for an improvement in the resolution of the yaw angle setting.

Once the adjustment to the orientations of elements 310, 320, and 330 shifts the beam to the desired direction and position, the optical components 310, 320, and 330 are "locked" into place by tightening clamping screws 342, 352, and 362. Alternatively, other mechanical means such as press fitting and/or an adhesive (e.g., an epoxy or the like) could lock the optical components into the adjusted positions in their respective optical mounts.

The base plate 370 is shown having four mounting feet. Base plate 370 could contain kinematic features for precise location repeatability and strain attenuation. Traditional kinematic features include a cone, vee, and flat or three non-parallel vees. These types of features can be machined into base plate 370 and prevent manipulator 300 from moving relative to the beam source or the optical system receiving the beam.

In accordance with another aspect of the invention, a thick pair of wedges sometimes referred to herein as a "trans-wedge" adjusts both the direction and position of a beam. A manipulator containing the thick wedges achieves the desired displacement and deflection of a beam through rotations of the wedges and pitch and yaw control of the wedges. The result is a compact beam manipulator that ideally reduces product costs by eliminating the need for a separate translator optic and associated translator hardware.

Figure 6A:
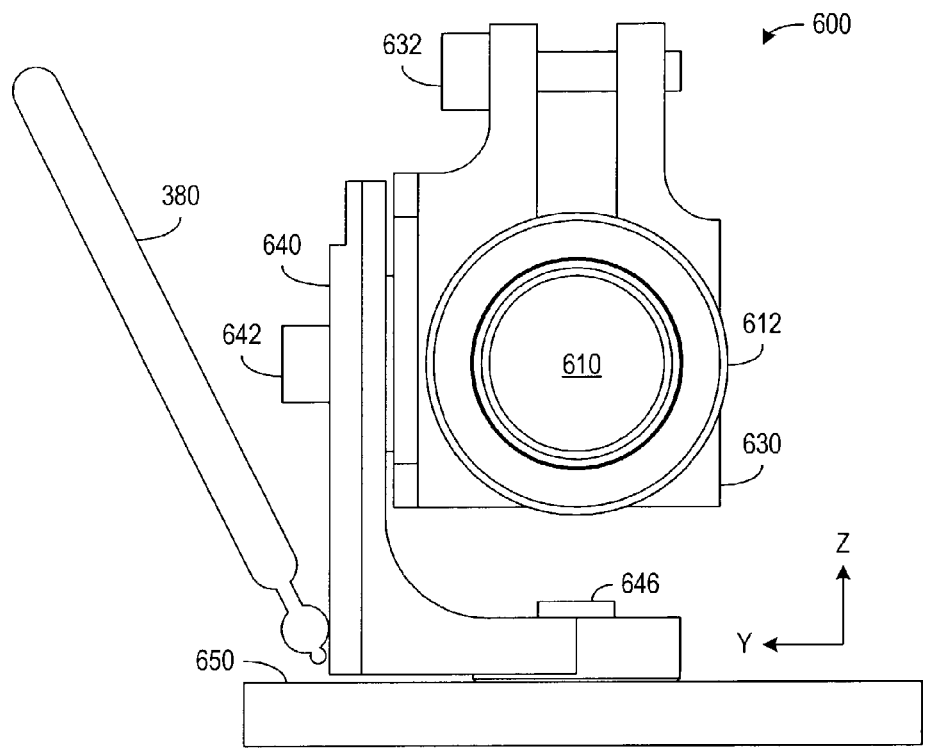
FIGS. 6A and 6B respectively show an elevation view and a perspective view of a beam manipulator using a Risley prism set for adjustment of both the direction and the position of a beam.
Figure 6B:
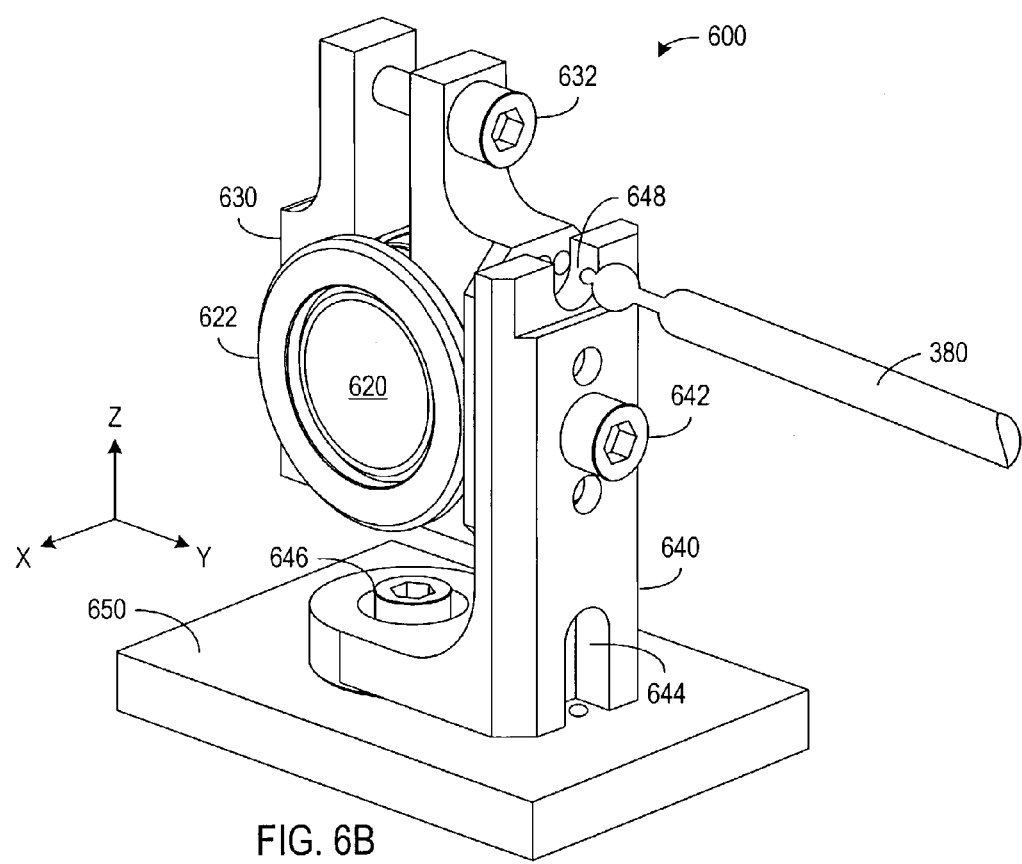

FIGS. 6A and 6B illustrate an exemplary embodiment of a trans-wedge manipulator 600. Trans-wedge manipulator 600 includes a pair of thick wedges 610 and 620 that are mounted in respective optic holders 612 and 622, which can be of the same design as optic holder 322 of FIG. 4. In an exemplary embodiment of the invention, each wedge 610 and 620 is a prism of an optical material such as BK7 having a circular cross-section and opposite sides that are at a physical wedge angle between 100 μrad and 20 mrad. Each wedge 310 or 320 is preferably about 3 mm to about 18 mm thick depending on the maximum deflection capability desired. Wedges 610 and 620 generally need to have the same physical wedge angle to provide a configuration with zero angular deflection, but wedge 610 could be thicker or thinner than wedge 620. Typically, wedges 610 and 620 are substantially identical.

The air gap between wedges 610 and 620 is preferably as small as possible. In one exemplary embodiment, the air gap is about 2 mm.

Optic holders 612 and 622 fit into opposite ends of an opening through a clamp 630 and can be rotated individually or together as a unit when a clamping screw 632 is loose. Since wedges 610 and 620 are thick, rotation of optic holders 612 and 622 in clamp 630 may significantly change both the deflection and the displacement of a traversing beam.

A screw 642 attaches clamp 630 to a mount 640 but when loose permits rotation of clamp 630 for control of the pitch of clamp 630 and wedges 610 and 620. For precise control of the pitch of wedges 610 and 620, mount 640 includes a notch 648 through which a tool 380 can engage and rotate clamp 630. A screw 646 attaches mount 640 to a base 650, and rotating mount 640 about screw 646 (when screw 646 is loose) controls the yaw angle of wedges 610 and 620. For precise control of the yaw of wedges 610 and 620, mount 640 includes a notch 644 through which a tool 380 can engage and rotate mount 640 about an axis parallel to the Z direction.

Changing the pitch and yaw of wedges 610 and 620 primarily change the Z and Y components of the beam displacement but may also change the direction of the beam. Similarly, rotating wedges 610 and/or 620 primarily changes the direction of the beam but also changes the position of the beam. The pitch and yaw adjustments and rotations of wedges 610 and 620 in clamp 630 thus couple together both angular and position adjustments of the beam.

Equation 1 gives an approximate formula for the angular deflection δ through a trans-wedge such as trans-wedge 600 where α is the wedge angle, n is the index of refraction of the wedges, and φ is the incidence angle of the beam at the first optical surface of the wedge set. In an exemplary embodiment of the invention, wedge angle α is about 15 mrad, and refractive index n is about 1.515. Incident angle φ depends on the pitch and yaw angles of the trans-wedge manipulator. If incident angle φ is zero, the bracketed term in Equation 1 has a value of one. This is the case for a stationary wedge set that is aligned with the incident beam and not free to pitch or yaw relative to the incident beam. For the trans-wedge where incident angle is generally non-zero, the bracketed term of Equation 1 is greater than or equal to one.

$$\text{Equation 1: } \delta = \alpha(n-1)\left[1 + \frac{\varphi^2(n+1)}{2n}\right]$$

Figure 7:
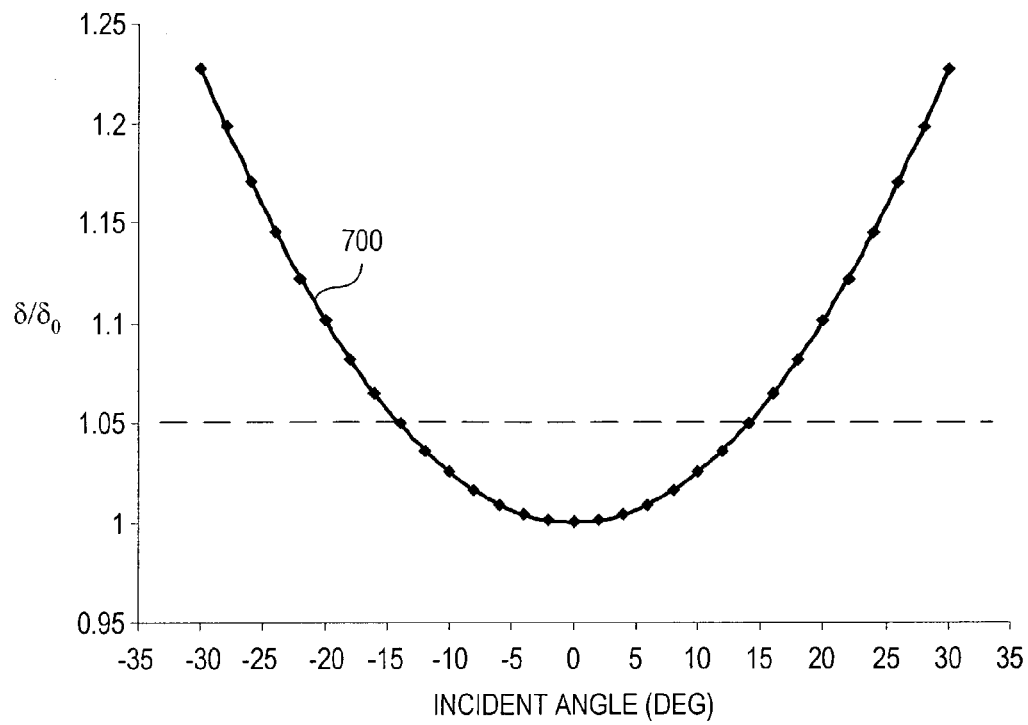
FIG. 7 shows a plot illustrating dependence of beam position on angular deflection in the beam manipulator of FIGS. 6A and 6B.

FIG. 7 is a plot 700 of the ratio $\delta/\delta_0$ of angular deflection δ for incident angle φ to beam deflection $\delta_0$ at zero incident angle. Plot 700 shows that rotation of the wedge set induces extra beam deflection and larger rotations cause larger deflections. The exception to this is when the wedge set is adjusted so that the angular defection of one wedge cancels the angular deflection of the other wedge and therefore the beam deflection $\delta_0$ at zero incident angle is zero. In this case, the wedge set behaves like a plane parallel plate, and the dependence on the physical wedge angle α is eliminated.

If the wedge set is not adjusted so that angular deflection $\delta_0$ is zero, the coupling of the incident angle φ to both the displacement of the beam and the angular deflection of the beam may require an iterative adjustment process to achieve the desired accuracy in beam position and direction.

Figure 8:
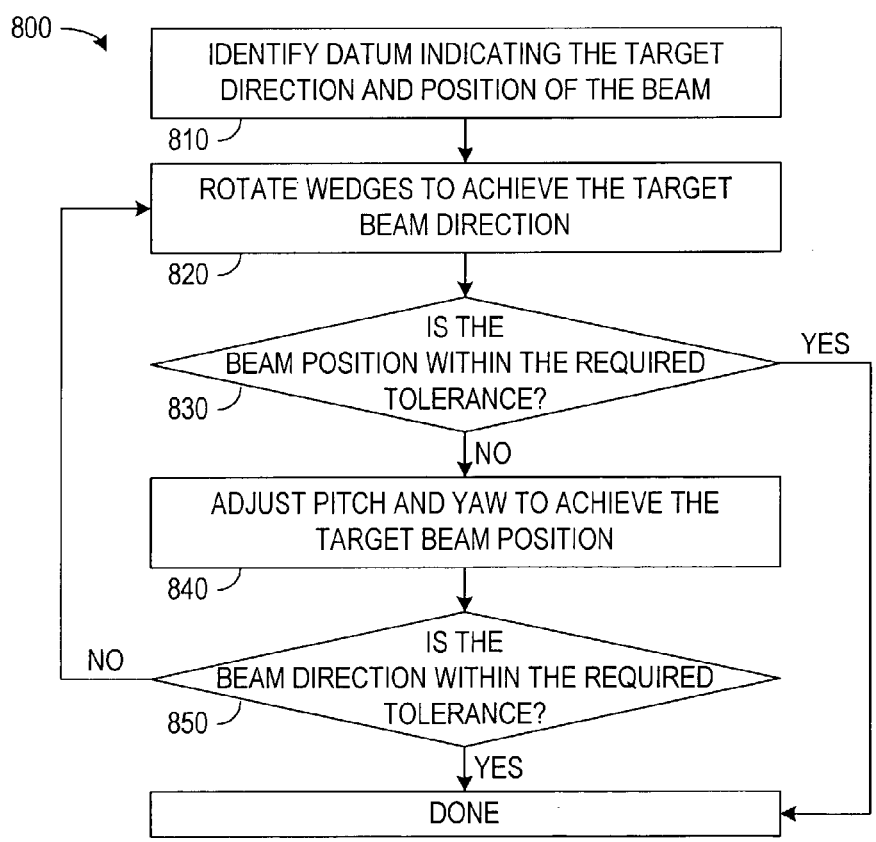
FIG. 8 is a flow diagram of an iterative adjustment process for a trans-wedge manipulator in accordance with an embodiment of the invention.

FIG. 8 is a flow diagram illustrating an iterative process 800 that adjusts the orientations of the wedges and the pitch and yaw of the wedge set to achieve a desired beam position and direction. Process 800 begins in step 810 by establishing a target direction and a target position for the beam being adjusted. One example where process 800 may be employed is for a combination of two laser beams so that the two beams are concentric and travel in the same direction. In such situations, one of the beams can be selected to be the datum defining the target, and process 800 uses a trans-wedge beam manipulator 600 to adjust the other beam to coincide with the direction and position of the target beam at the output of a beam combiner. Without adjustment, the two beams may have initial directions and positions that are properly aligned up to some initial tolerances that depend on the source or sources of the beams. For example, a fiber collimator, which creates a collimated laser beam, may provide a beam with an angular misalignment less than 5 mrad and a translation misalignment less than about 0.5 mm with respect to its mounting surfaces. The desired alignment tolerances for the combined beams are less than the beam source can achieve, e.g., an angular offset less than 2 μrad and translational offset less than 10 μm.

Once the target beam direction and beam position are selected, step 820 rotates wedges 610 and 620 individually and/or together as a unit to achieve the target beam direction within the desired angular tolerance. As noted above, rotation of one wedge relative to the other changes the angle of the beam relative to an axis through wedges 610 and 620, and rotation of wedges 610 and 620 together as a unit sweeps the beam along a cone having an angular opening set by the relative positions of wedges 610 and 620.

Step 830 checks whether the beam after the angular adjustment of step 820 is within the required tolerance of the target position. If so, adjustment process 800 has adjusted the beam to the target position and direction within the desired tolerances, and process 800 is complete. If not, process 800 moves to step 840 and adjusts the pitch and/or yaw of the wedge set to reposition the beam.

Position adjustment step 840 adjusts the position of the beam so that the beam is within the required tolerance of the target position. However, as noted above and illustrated in FIG. 7, the adjustment of the position generally also changes the direction of the beam. Step 850 therefore checks to determine whether the beam direction is within the required tolerance of the target direction after position adjustment step 840. If so, process 800 is done. If not, process 800 returns from step 850 to step 820 to readjust the direction of the beam.

Process 800 can generally converge on the target beam direction and position in a few iterations if the size of the required adjustment is not too large. If incident angle φ, is kept below about 15°, FIG. 7 shows that the angular deflection caused by pitch and yaw adjustment will be less than about 5% of the angular deflection caused by wedge rotation, and rapid convergence to the target can be expected. In the exemplary embodiment of the invention, process 800 rapidly converges to the target for beam deflections of up to about 7 mrad and beam displacements of up to about 0.8 mm.

Large angular or position adjustments may require that the first adjustment (e.g., angular adjustment by rotations of wedges 610 and 620) overshoot or undershoot the datum, so that the second adjustment (e.g., adjustment of pitch and yaw) can correct both the position and the direction of the beam. Similarly, the first translation of the beam through pitch and yaw adjustment can overshoot or undershoot the target position so that the next angle adjustment through wedge rotation brings position and direction towards the targets.

Trans-wedge 600, as noted above, can achieve excellent translation and angular adjustment resolution when operating near zero incident angle, and trans-wedge 600 can be the only beam manipulator where a system permits such operation. The trans-wedge can thus reduce the space required to manipulate a laser beam in angle and position, thus reducing product mass and overall size of an optical system requiring precise beam control. The trans-wedge manipulator also provides a relatively low cost method for achieving desired beam steering.

Figure 9:
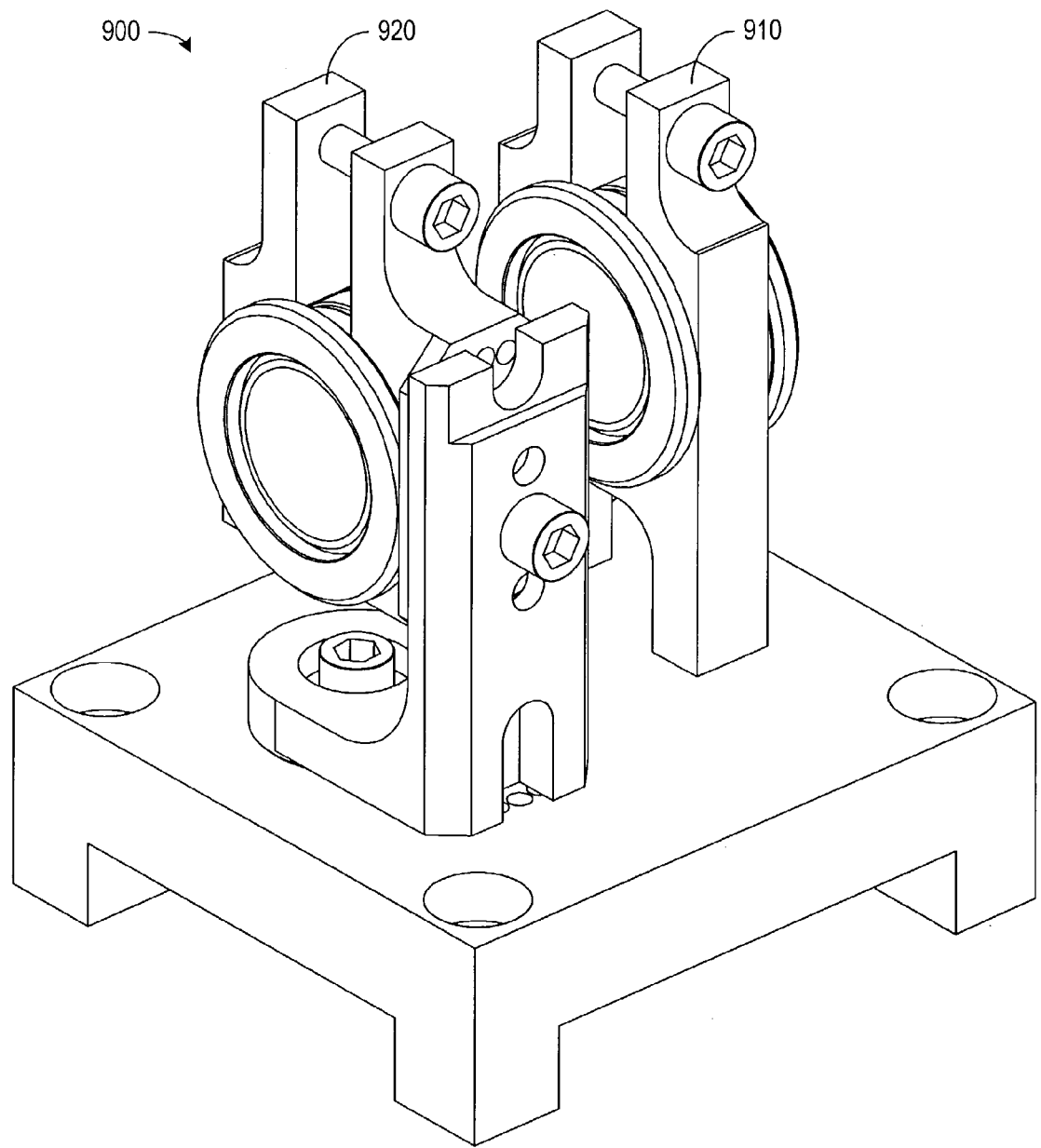
FIG. 9 is a perspective view of a manipulator including a coarse wedge set for rough angular beam adjustments and a fine trans-wedge set for beam translation and fine angular beam adjustments.

Two or more manipulators can implement large angle corrections in systems where the adjustment process using a single trans-wedge manipulator would be inconvenient. FIG. 9 shows an example of a manipulator 900 including a first manipulator 910 and a second trans-wedge manipulator 920. The first manipulator 910, which can include a mounting structure identical to mount 340 of FIGS. 3A and 3B, has a coarse wedge set (e.g., having a physical wedge angle of about 17 mrad). The second trans-wedge manipulator 920, which can be substantially identical to trans-wedge manipulator 600 of FIGS. 6A and 6B, has a fine wedge set (e.g., having a physical wedge angle of about 250 μrad). Manipulator 910 containing the coarse wedge set nominally brings an input beam onto a datum axis direction, allowing the trans-wedge manipulator 920 containing the fine wedge set to operate near zero incident angle and behave similar to a plane parallel plate translator with the advantage of having fine angular adjustment for increased angular resolution.

Although the invention has been described with reference to particular embodiments, the description is only an example of the invention's application and should not be taken as a limitation. For example, although the above description includes examples of particular dimensions and adjustment tolerances, manipulators in accordance with the invention are not limited to the particular adjustment ranges or resolutions in the described examples. Additionally, the exemplary beam manipulators described above can be resized to manipulate any size beam, including but not limited to those used in interferometer displacement measuring equipment. Various other adaptations and combinations of features of the embodiments disclosed are within the scope of the invention as defined by the following claims.

What is claimed is:

1. A beam manipulator comprising:
   a plate having opposing parallel surfaces;
   a first wedge along an optical path through the plate;
   a second wedge along the optical path; and
   a mounting structure for the plate, the first wedge, and the second wedge, wherein the mounting structure provides adjustments including:
   rotation of the first wedge about the optical path;
   rotation of the second wedge about the optical path, wherein the rotation of the second wedge is independent of the rotation of the first wedge; and
   adjustment of a pitch angle and a yaw angle of the plate relative to the optical path.

2. The beam manipulator of claim 1, wherein the mounting structure comprises:
   a base;
   a first optical mount attached to the base, the plate being mounted in the first optical mount; and
   a second optical mount attached to the base, the first and second wedges being mounted in the second optical mount.

3. The beam manipulator of claim 2, wherein the first optical mount comprises:
   an optic holder to which the plate is attached; and
   a structure which attaches to the base in a manner that permits rotation of the structure about a first axis, the optic holder being attached to the structure in a manner that permits rotation of the optic holder about a second axis.

4. The beam manipulator of claim 3, wherein the second axis is perpendicular to the first axis.

5. The beam manipulator of claim 2, wherein the second optical mount comprises a structure attached to the base, wherein the first wedge is mounted on a first side of an opening through the structure and the second wedge is mounted on a second side of the opening.

6. The beam manipulator of claim 3, wherein the plate is glued to the optic holder.

7. The beam manipulator of claim 1, further comprising an optic holder for the plate, wherein the plate has a convex perimeter portion that fits within a concave portion of the optic holder, the convex perimeter portion of the plate being glued to the concave portion of the holder.

8. The beam manipulator of claim 1, further comprising an optic holder for the first wedge, wherein the first wedge is glued to the optic holder.

9. The beam manipulator of claim 8, wherein the optic holder is ring-shaped and has an inner diameter greater than a diameter of the first wedge, wherein the first wedge is glued to an inner ledge of the optic holder, the inner ledge extending radially inward from the inner diameter of the optic holder.

10. The beam manipulator of claim 2, wherein the second optical mount comprises:
   a ring structure having an opening;
   a first optic holder containing the first wedge, the first optic holder fitting into a first side of the opening in a manner that permits rotation of the first optic holder about an optical path through the opening; and
   a second optic holder containing the second wedge, the second optic holder fitting into a second side of the opening in a manner that permits rotation of the second optic holder about the optical path through the opening.

11. The beam manipulator of claim 10, wherein the first holder is ring-shaped and has an inner diameter greater than a diameter of the first wedge, wherein the first wedge is glued to an inner ledge of the optic holder, the inner ledge extending radially inward from the inner diameter of the optic holder.

12. The beam manipulator of claim 10, wherein the ring structure comprises a clamp that loosens to expand the size of the opening to permit rotation of the first and second optic holders and tightens to prevent rotation of the first and second optic holders.

13. The beam manipulator of claim 10, wherein the opening is scalloped so that only separated regions around the opening contact the first optic holder.

* * * * *

UNITED STATES PATENT AND TRADEMARK OFFICE
CERTIFICATE OF CORRECTION

PATENT NO. : 7,035,025 B2  
APPLICATION NO. : 10/447429  
DATED : April 25, 2006  
INVENTOR(S) : Prince et al.

Page 1 of 1

It is certified that error appears in the above-identified patent and that said Letters Patent is hereby corrected as shown below:

In column 12, line 3, in Claim 11, after "first" insert - - optic - -.

Signed and Sealed this

Twenty-ninth Day of August, 2006

JON W. DUDAS  
*Director of the United States Patent and Trademark Office*